United States Patent
Liu et al.

(10) Patent No.: US 10,339,964 B1
(45) Date of Patent: Jul. 2, 2019

(54) PERPENDICULAR MAGNETIC RECORDING (PMR) WRITE HEAD WITH PATTERNED HIGH MOMENT TRAILING SHIELD

(71) Applicant: Headway Technologies, Inc., Milpitas, CA (US)

(72) Inventors: Ying Liu, San Jose, CA (US); Yue Liu, Fremont, CA (US); Yuhui Tang, Milpitas, CA (US); Kei Hirata, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/984,680

(22) Filed: May 21, 2018

(51) Int. Cl.
  *G11B 5/147* (2006.01)
  *G11B 5/127* (2006.01)
  *G11B 5/11* (2006.01)
  *G11B 5/31* (2006.01)

(52) U.S. Cl.
  CPC .......... *G11B 5/147* (2013.01); *G11B 5/11* (2013.01); *G11B 5/1278* (2013.01); *G11B 5/3116* (2013.01)

(58) Field of Classification Search
  CPC ..... G11B 5/147; G11B 5/1278; G11B 5/3116; G11B 5/11
  See application file for complete search history.

(56) References Cited

U.S. PATENT DOCUMENTS

| | | | |
|---|---|---|---|
| 7,009,812 B2 | 3/2006 | Hsu et al. | |
| 8,068,312 B2 | 11/2011 | Jiang et al. | |
| 8,284,516 B1 * | 10/2012 | Tang | G11B 5/1278 360/125.03 |
| 8,472,139 B2 | 6/2013 | Urakami et al. | |
| 8,498,079 B1 | 7/2013 | Song et al. | |
| 8,582,241 B1 | 11/2013 | Yu et al. | |
| 9,466,319 B1 | 10/2016 | Tang et al. | |
| 9,508,364 B1 * | 11/2016 | Tang | G11B 5/112 |
| 10,014,021 B1 * | 7/2018 | Liu | G11B 5/1278 |
| 10,032,469 B2 * | 7/2018 | Lim | G11B 5/315 |
| 2007/0236831 A1 | 10/2007 | Che et al. | |
| 2009/0091861 A1 * | 4/2009 | Takano | G11B 5/1278 360/319 |
| 2011/0051293 A1 * | 3/2011 | Bai | G11B 5/1278 360/313 |
| 2011/0273800 A1 * | 11/2011 | Takano | G11B 5/1278 360/125.12 |

(Continued)

*Primary Examiner* — Brian E Miller
(74) *Attorney, Agent, or Firm* — Saile Ackerman LLC; Stephen B. Ackerman

(57) ABSTRACT

A perpendicular magnetic recording writer is disclosed wherein a first trailing shield (HMTS) layer has a down-track (DT) thickness d in portions thereof proximate to a center plane that bisects the main pole tip trailing side to enable enhanced trailing shield return field at track center thereby improving bits per inch (BPI) capability. Meanwhile, at off track center positions, that in some embodiments are from 25 nm to 500 nm from the center plane, the HMTS layer has a DT thickness d1, where d1>d, and a smaller dielectric gap between the HMTS layer and the main pole thereby protecting side shield return field and adjacent track interference (ATI) performance. A method of forming the HMTS layer on a write gap is provided and includes patterning the HMTS layer in a back portion to form openings that are filled with the smaller dielectric gap and HTMS layer thickness d1.

29 Claims, 11 Drawing Sheets

(56) References Cited

U.S. PATENT DOCUMENTS

2012/0125886 A1* 5/2012 Hong .................. G11B 5/1278
216/22
2017/0133044 A1 5/2017 Lim et al.

* cited by examiner

PERPENDICULAR MAGNETIC RECORDING (PMR) WRITE HEAD WITH PATTERNED HIGH MOMENT TRAILING SHIELD

RELATED PATENT APPLICATION

This application is related to the following: U.S. Patent application 2017/0133044; assigned to a common assignee and herein incorporated by reference in its entirety.

TECHNICAL FIELD

The present disclosure relates to a high moment trailing shield (HMTS) formed on a write gap wherein a back portion thereof that is recessed from the ABS has a smaller down-track (DT) thickness and greater dielectric gap to the main pole in regions proximate to a center plane formed at the center track position, and a greater DT thickness and smaller dielectric gap at certain off track center regions to enable better overwrite (OW) performance and improved bits per inch (BPI) capability while maintaining, and in some cases, enhancing tracks per inch (TPI) capability and adjacent track interference (ATI) for both conventional and shingle magnetic recording applications.

BACKGROUND

Perpendicular magnetic recording has been developed in part to achieve higher recording density than is realized with longitudinal recording devices. A PMR write head (writer) typically has a main pole layer with a small surface area at an air bearing surface (ABS), and coils that conduct a current and generate a magnetic flux in the main pole such that the magnetic flux exits through a main pole tip and enters a magnetic medium (disk) adjacent to the ABS. Magnetic flux is used to write a selected number of bits in the magnetic medium and typically returns to the main pole through two pathways including a trailing loop and a leading loop where both involve a shield structure. The trailing loop comprises a trailing shield structure at the ABS with a HMTS having a magnetization saturation value from 16 kiloGauss (kG) to 24 (kG), and a second trailing shield formed on a top surface and sides of the HMTS. The leading loop includes a leading shield with a front side at the ABS and that is connected to a return path proximate to the ABS. The return path extends to the back gap connection and enables magnetic flux in the leading loop pathway to return from the leading shield through the back gap connection to the main pole layer.

For both conventional (CMR) and shingle (SMR) magnetic recording, continuous improvement in storage area density is required for a PMR writer. A write head that can deliver or pack higher bits per inch (BPI) and higher tracks per inch (TPI) is essential to the area density improvement. An all wrapped around (AWA) shield design for a PMR write head is desired where the trailing shield is responsible for improving down track field gradient and BPI while side shields and a leading shield enhance the cross track field gradient and TPI as well as improve adjacent track erasure (ATE) also known as ATI.

In today's PMR writer designs, the HMTS formed on the write gap plays a key role in improving BPI. In particular, the HMTS attracts more main pole (MP) field to return from the soft underlayer (SUL) and thus enhance the field gradient in the down-track direction. The spacing (gap) between the HMTS and MP also controls the flux shunting of MP field and helps protect TPI and ATI. In the prior art, the HMTS is patterned only in a perpendicular direction that is orthogonal to the ABS so that there is no variation in down-track (DT) thickness as a function of cross-track position. Accordingly, further improvement in PMR writer performance is limited in terms of the tradeoff between enhancing TS return field, and improving side shield (SS) return field and ATI. Therefore, a new trailing shield design is needed to optimize the tradeoff between DT performance and cross-track (CT) performance for a PMR writer in hard disk drive (HDD).

SUMMARY

One objective of the present disclosure is to provide a HMTS layer for a PMR writer that enables an improvement in BPI and OW without compromising TPI and ATI.

Another objective of the present disclosure is to provide a method of forming the improved HMTS layer of the first objective that is readily implemented in a manufacturing environment.

According to a first embodiment, these objectives are achieved with a PMR writer that has an all wrap around (AWA) shield structure wherein a leading shield, side shields, and trailing shield structure surround a main pole (MP) at the ABS, and adjoin a lead gap, side gap, and write gap, respectively. The trailing shield structure comprises a HMTS layer having a front portion formed on the write gap at the ABS, and a second trailing shield (TS) formed on a top surface and sides of the HMTS layer and write gap. The HMTS layer also has a middle portion behind a front side of the second TS that extends from a backside of the HMTS front portion at a first height ($h1$) to a front side of a HMTS back portion that is a second height ($h2$) from the ABS where $h2>h1$. The HMTS back portion and second TS both have a backend at a third height ($h3$) where $h3>h2$. The top surface of the HMTS back portion is aligned orthogonal to the ABS between $h2$ and $h3$.

The HMTS back portion has a first down-track (DT) thickness d in unpatterned regions having a first bottom surface that is a first gap distance (g) from the MP top surface. The HMTS back portion also has patterned regions with a DT thickness $d1$, where $d1>d$, and a second bottom surface that is a second gap distance ($g1$) from the MP top surface where $g>g1$. Both of the first and second bottom surfaces are aligned parallel to the MP top surface, and are orthogonal to the ABS. Furthermore, first and second gaps between the HMTS back portion and MP top surface are filled with a dielectric layer.

From a top-down view along a second plane that comprises the second bottom surface of the HMTS back portion and is orthogonal to the ABS, a key feature according to a first embodiment is that the HMTS back portion has variable DT thickness as a function of cross-track position. At a center plane that is orthogonal to the ABS at the center track position, and between third and fourth planes that are equidistant from the center plane and separated by cross-track width w, DT thickness d and gap g are maintained throughout the entire HMTS back portion behind a first plane at pattern height h. Thus, there is a first inner HMTS side formed at each of the third and fourth planes between the first plane and HMTS backend. At cross-track positions behind the first plane and at a width$>w/2$ from the center plane where w is from 120 nm to 300 nm, the HMTS back portion has a DT thickness $d1$ in patterned regions as explained later.

In front of the first plane and behind a backside of the HMTS front or middle portion, there are two second inner HMTS sides that have greater cross-track separation as distance decreases from the ABS. Within a trapezoidal shape formed by a first side of width w at the first plane, the backside of the HMTS front or middle portion of width m, where m>w, and the second inner HMTS sides, the HMTS back portion has DT thickness d. The HMTS back portion has DT thickness d1 at other (patterned) regions in front of the first plane. Each second inner HMTS side intersects the first plane and forms an angle θ with respect to the third plane or fourth plane.

According to a second embodiment that is a modification of the first embodiment, the trapezoid shape in front of the first plane having a HMTS DT thickness d, and patterned regions outside the trapezoid are retained, but the patterned region behind the first plane is expanded such that all of the HMTS back portion between the first plane and backend has DT thickness d1. In the first and second embodiments, θ varies from +10 degrees to +90 degrees.

In a third embodiment that represents a modification of the second embodiment, the size of the patterned region in front of the first plane is expanded meaning that the trapezoid area is reduced. The second inner HMTS sides now have smaller separation with decreasing distance from the ABS such that the width v of a second side of the trapezoid at a backside of the HMTS front or middle portion is less than w of the first side at the first plane. Each second inner HMTS side forms an angle β from 0 to −90 degrees with respect to the third or fourth plane. Again, the HMTS back portion has a constant DT thickness d1 behind the first plane, and in regions in front of the first plane that are outside the trapezoid shape.

In all embodiments, the HMTS back portion is patterned such that DT thickness varies from d to d1 as a function of cross-track width, at least in front of the first plane. Accordingly, the larger gap g in the HMTS back portion proximate to the center track position (where HMTS DT thickness is d) guarantees a substantial TS return field at track center where transition sharpness is most influential in enhancing writing quality. Meanwhile, at certain off track center regions, excessive MP field will be shunted immediately by the greater DT thickness d1 in the HMTS back portion thereby protecting the side shield (SS) return field and ATI.

A fabrication method to form a patterned HMTS layer according to an embodiment of the present disclosure is also provided. A conformal thickness thickness d is formed in HMTS front and middle portions, and in unpatterned HTMS back regions. Subsequently, the HMTS back portion is patterned, and openings are filled with dielectric gap g1 and overlying HMTS thickness d1.

DETAILED DESCRIPTION

Figure 1:
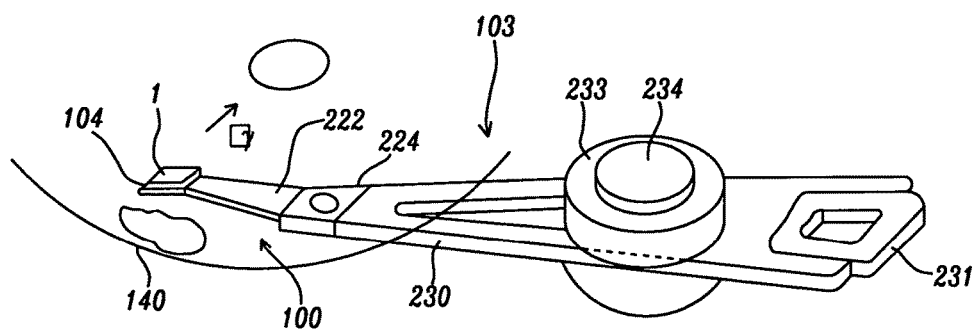
FIG. 1 is a perspective view of a head arm assembly of the present disclosure.

The present disclosure relates to a trailing shield design in a PMR writer wherein a HMTS layer formed on a write gap is patterned in a back portion thereof so that a HMTS down-track (DT) thickness is either a first thickness d or a second thickness d1 (d1>d) depending on the cross-track position from a center plane. The exemplary embodiment depicts a PMR writer having a so-called rDWS BGC base writer structure and an AWA shield design. However, the present disclosure also anticipates that other base writer schemes as well as different shield designs including but not limited to a partial side shield may be used while still providing the advantages of the patterned HMTS designs disclosed herein. In the drawings, the y-axis is a cross-track direction, the z-axis is a down-track direction, and the x-axis is in a direction orthogonal to the ABS and towards a back end of the PMR writer. Thickness refers to a down-track distance, width is a cross-track distance, and height is a distance from the ABS in the x-axis direction.

The term "behind" refers to an x-axis position of one structural feature with respect to another. For example, component B formed behind component or plane A means that B is a greater height from the ABS than A. A "front side" of a layer is a side facing the ABS, and a backside or backend faces away from the ABS. The terms "above" and "below" when referring to a down-track position of a layer with respect to a plane means that a layer above the plane is a greater DT distance from the MP top surface than a layer below the plane.

Referring to FIG. 1, a HGA 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
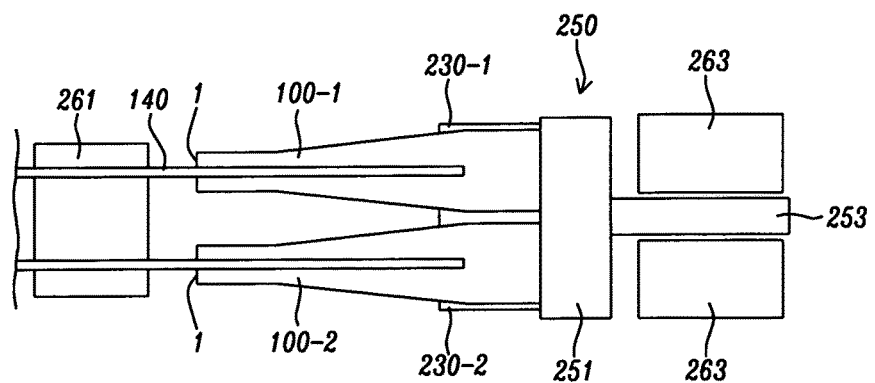
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
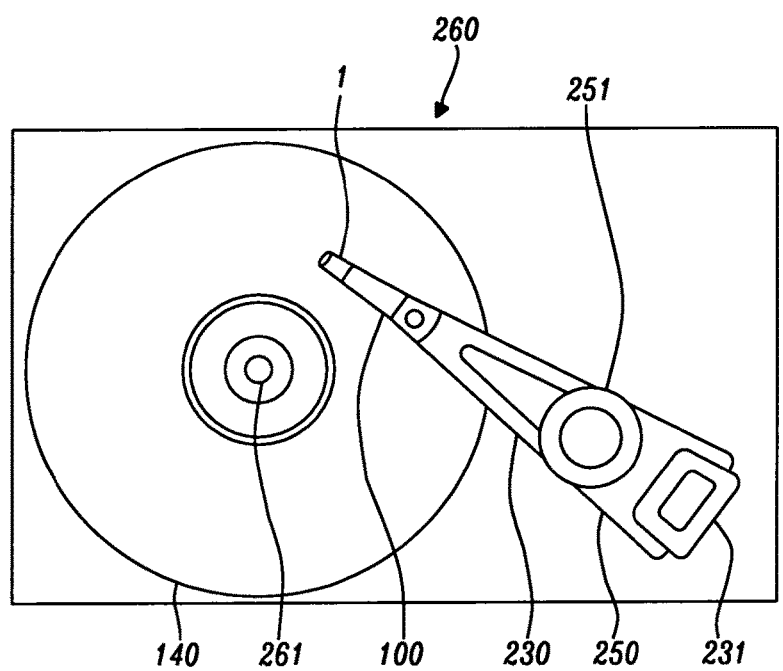
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
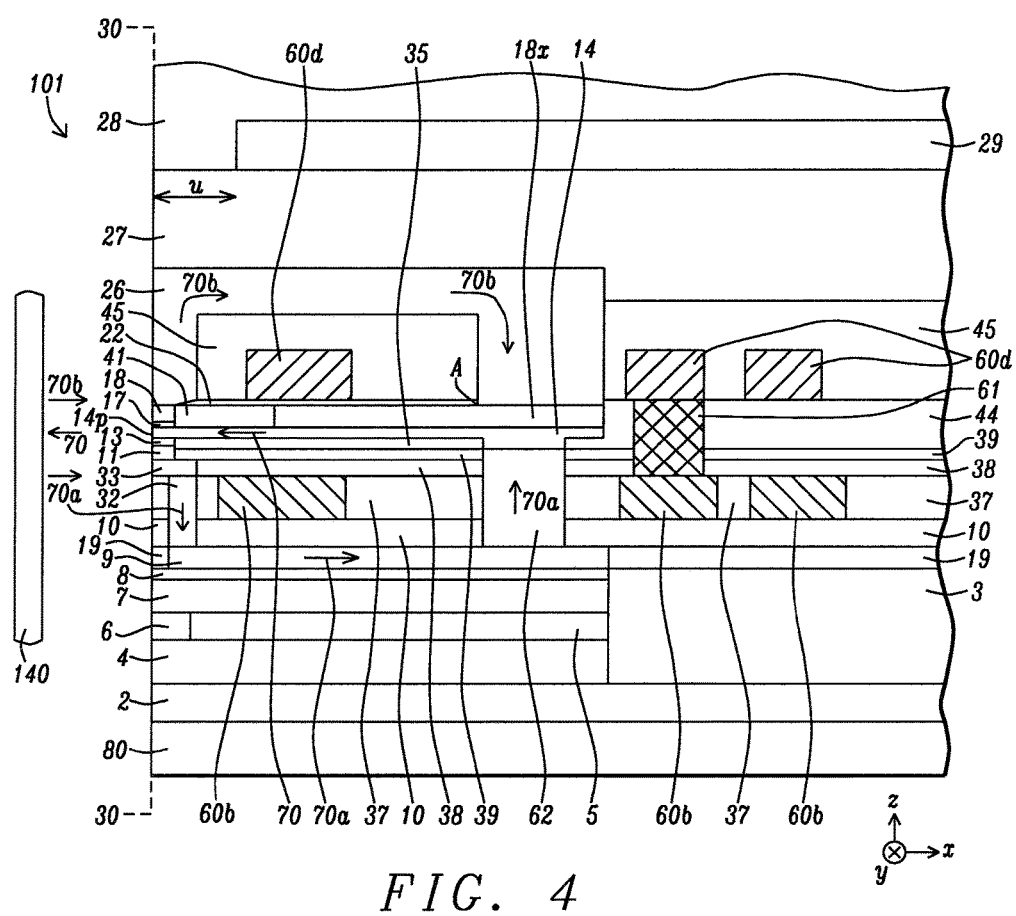
FIG. 4 is a down-track cross-sectional view that shows a PMR writer having a double write shield (DWS) design with two flux return pathways to the main pole according to an embodiment of the present disclosure.

Referring to FIG. 4, a PMR writer according to one embodiment of the present disclosure depicted in a down-track cross-sectional view from a plane 50-50 (FIG. 5) that is orthogonal to ABS 30-30 and bisects the main pole tip 14p. The combined read/write head is formed on a substrate 80 that may be comprised of AlTiC (alumina+TiC). Those skilled in the art will recognize that layers 2-8 represent the read head portion of the recording device while overlying layers represent the write head portion. The substrate is typically part of a slider (not shown) formed in an array of sliders on a wafer. After the combined read/write head is completed, the wafer is sliced to form rows of sliders. Each row is typically lapped to afford an ABS before dicing to fabricate individual sliders for a HDD.

The present disclosure anticipates that one or more dynamic fly height (DFH) heater elements (not shown) may be formed in one or more insulation layers in the PMR writer structure to control the extent of thermal expansion (protrusion) along the ABS 30-30 and toward a magnetic medium 140 during a read or write process. Read gap (RG) and write gap (WG) protrusion may be tuned by the placement of the one or more DFH heater elements, and by the choice of metal or alloy selected for the DFH heater elements since each DFH heater resistor material has a particular thermal and mechanical response to a given electrical input. The DFH heater in the writer is often positioned in one or more of the dielectric layers 38, 39, and 44 behind interconnect 61, and between bucking coil 60b and driving coil 60d to yield the desired gamma ratio.

A first insulation layer 2 that may be comprised of alumina or another dielectric material is disposed on substrate 80. There is a second insulation layer 3 formed on the first insulation layer and behind the read head layers 4-8. Above layer 2 is the S1 shield 4 that is comprised of NiFe or CoFeNi or the like, and extends from the ABS toward a back end of the read head. A magnetoresistive element (sensor) 6 is formed between the S1 shield 4 and S2A shield 7 at the ABS 30-30 and typically includes a plurality of layers (not shown) in which two ferromagnetic layers are separated by a non-magnetic layer. The magnetic moment direction in one of the ferromagnetic layers is fixed and provides a reference direction, and the moment direction in the other ferromagnetic layer may be rotated by the magnetic field from the media. Resistance across gap layer 5 changes as the moment in the second ferromagnetic layer rotates. A "0" or "1" magnetic state can be defined depending on whether the two ferromagnetic layers are magnetically aligned in the same direction or in an antiparallel fashion. The non-magnetic layer in the sensor 6 may be an insulator such as MgO in a tunneling magnetoresistive (TMR) sensor. Insulation layer 8 is the uppermost layer in the read head although in some embodiments, the return path (RTP) 9 also serves as the S2B shield in the read head while magnetic layer 7 is the S2A shield.

The present disclosure anticipates that various configurations of a write head (PMR writer) may be employed with the read head portion. In the exemplary embodiment, the base writer structure has a so-called rDWS BGC design where DWS refers to a double write shield wherein a trailing loop comprised of a trailing shield structure, and a leading loop comprised of a leading shield allow magnetic flux 70b and 70a, respectively, to return to the main pole layer 14. BGC indicates a back gap connection 62 in the leading loop comprised of the leading shield 11, leading shield connector (LSC) 33, S2C connector 32, RTP 9, and the BGC. Magnetic flux 70 in main pole layer 14 is generated by flowing a current through bucking coil 60b and driving coil 60d that are below and above the main pole layer, respectively, and are connected by interconnect 61. Magnetic flux 70 exits the main pole layer at pole tip 14p at the ABS 30-30 and is used to write a plurality of bits on magnetic media 140. Magnetic flux 70b returns to the main pole through a trailing loop comprised of first trailing shield 17 also known as the HMTS layer, second trailing shield (TS) 18, PP3 shield 26, and top yoke 18x. The magnetic core may also comprise a bottom yoke 35 below the main pole layer. Dielectric layers 10, 11, 13, 19, 22, 37-39, 44, and 45 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

HMTS layer 17 has a bottom surface formed on a write gap (not shown) at the ABS and adjoins a non-magnetic (dielectric) layer 41. The second TS layer 18 also extends from the ABS to dielectric layer 41, and like the HMTS layer, may be made of CoFeN, CoFeNi, NiFe, or CoFe. The HMTS layer has a magnetization saturation (Ms) value from 16 kG to 24 kG. Second TS layer 18, top yoke 18x and the PP3 trailing shield 26 are typically made of 16 kG to 19 kG materials. Top yoke 18x has a backside at point A that touches the inner corner of the PP3 trailing shield.

Figure 5:
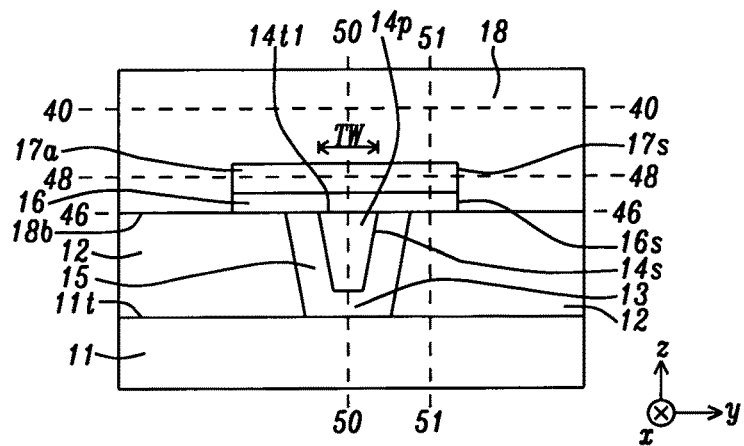
FIG. 5 is an ABS view of the PMR writer in FIG. 4 having an all wrap around (AWA) shield structure according to an embodiment of the present disclosure.

Referring to FIG. 5, an ABS view is depicted of a portion of the write head including main pole layer 14 with main pole tip 14p that has track width TW, a trailing side 14t1 bisected by center plane 50-50, and is surrounded by an AWA shield structure. The HMTS layer has a HMTS front portion 17a formed on write gap 16. Preferably, each side 17s of the HMTS front portion is coplanar with a side 16s of the write gap. Second TS layer 18 is formed on the HMTS layer and adjoins sides 16s, 17s, and has a bottom surface 18b that adjoins side shields 12 at plane 46-46. Top (trailing) side 14t1 also intersects the ABS at plane 46-46. Leading shield 11 has a top surface 11t that contacts the side shields and lead gap 13. Side gaps 15 separate sides 14s of the main pole tip from the side shields. Plane 51-51 is a plane that is off track center, and is parallel to plane 50-50. Plane 40-40 is orthogonal to the ABS, intersects a HMTS middle portion (not shown) and comprises a bottom surface of a HMTS back portion as explained later with regard to embodiments of the present disclosure. In other embodiments, the bottom surface of the HMTS back portion may be at plane 48-48 that intersects the HMTS front portion.

In related application 2017/0133044, we disclosed a conformal HMTS design that has a down-track cross-sectional view with an essentially constant DT thickness as a function of cross-track position. In other words, HMTS front portion 17a in FIG. 5, middle portion 17b, and back portion 17c are shown with the down-track cross-sectional view in FIG. 6 that features DT thickness d throughout the HMTS front portion, middle portion, and back portion. Moreover, the view in FIG. 6 applies to the center track position (plane 50-50 in FIG. 5), and to all off track center positions that intersect the HMTS layer including plane 51-51 in FIG. 5. The front portion extends from the ABS 30-30 to height h1, the middle portion extends from a backside of the front portion to height h2, and the back portion has top surface 17t and extends from a backside of the middle portion to height h3 at backend 17e. Main pole 14 is shown with a tapered leading side 14b1 that connects with MP bottom surface 14b2, and also has a tapered trailing side 14t1 that connects with MP top surface 14t2, which is orthogonal to the ABS and parallel to bottom surface 17d of the HMTS back portion. Dielectric layer 41 has a DT thickness g between the HMTS back portion and MP top surface at all cross-track locations that are between sides 17s of the HMTS front portion in FIG. 5.

Figure 7:
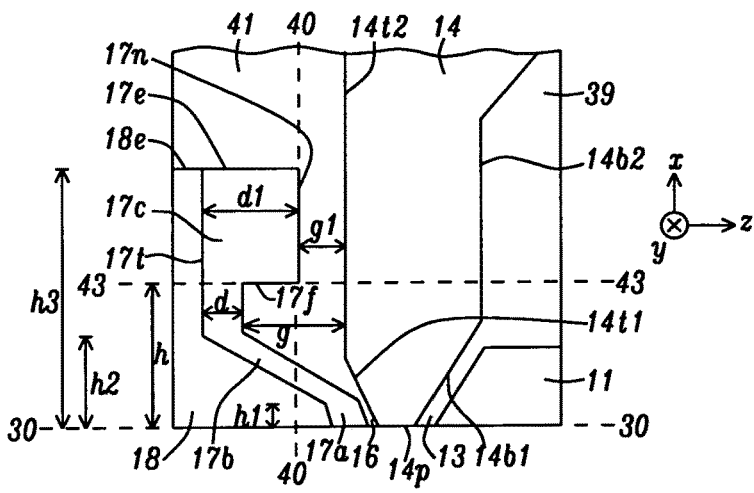
FIG. 7 is a down-track cross-sectional view along a plane that is off track center in the PMR writer of FIG. 5 and but less than width w/2 from the center plane according to an embodiment of the present disclosure.

In related application 2017/0133044, we also disclosed a patterned HMTS design as depicted in FIG. 7 where the conformal HMTS design is modified to have a second DT thickness d1 (d1>d) in the HMTS back portion 17c at a height greater than pattern height h, and while maintaining DT thickness d in the HTMS layer up to height h. The second DT thickness is achieved by forming a pattern comprised of an opening in the HMTS back portion between an ABS facing side 17f at plane 43-43 and the HMTS backend 17e, and that extends to the MP top surface 14t2, and then filling the opening by depositing dielectric material to thickness g1, followed by depositing HMTS back portion 17c with thickness d1 up to top surface 17t. As a result, there is a first gap of DT thickness g in the dielectric layer between the HMTS back portion and main pole top surface 14t1 up to height h at plane 43-43, and a second gap of DT thickness g1 (g1<g) between height h and the HMTS backend 17e at height h3. In this HMTS design hereinafter referred to as the process of record (POR) design, a key feature is a constant DT thickness (d or d1) as a function of cross-track position along plane 43-43 or at any plane parallel thereto that intersects the HMTS back portion. Thus, the down-track cross-sectional view illustrated in FIG. 7 is found at center plane 50-50 and at all off track center planes that intersect the HMTS such as plane 51-51 in FIG. 5.

Figure 8:
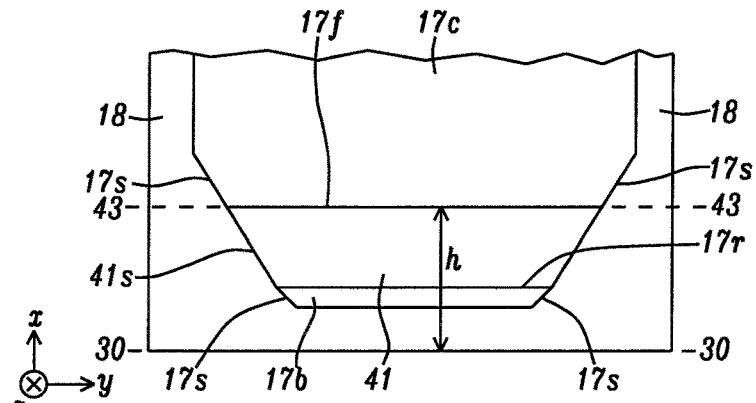
FIG. 8 is a top-down view of a patterned HMTS layer according to a process of record (POR) scheme wherein a DT thickness has a uniform height as a function of cross-track width.

A top-down view from plane 40-40 in FIG. 5 of the process of record (POR) design for a patterned HMTS layer is provided in FIG. 8. Note that the pattern height between the ABS 30-30 and plane 43-43 is a constant h as a function of cross-track position along the y-axis direction, which means the HMTS back portion 17c has constant thickness d1 behind pattern height h, and constant thickness d in front of plane 43-43. HMTS front portion 17a is not visible below second TS layer 18 from this viewpoint, and HMTS middle portion 17b has a backside 17r. Dielectric layer 41 fills the gap between backside 17r and a front side 17f of HMTS back portion at plane 43-43. A side 41s of the dielectric layer is coplanar with side 17s of the HMTS back portion. Although this design improves the TS return field (BPI), there is a tradeoff with less desirable SS return field (TPI) and ATI. Therefore, we were motivated to modify the HMTS POR design to allow variable DT thickness with cross-track position so that BPI may be enhanced without a loss in TPI and ATI for an overall improvement in ADC according to various embodiments of the present disclosure.

Figure 6:
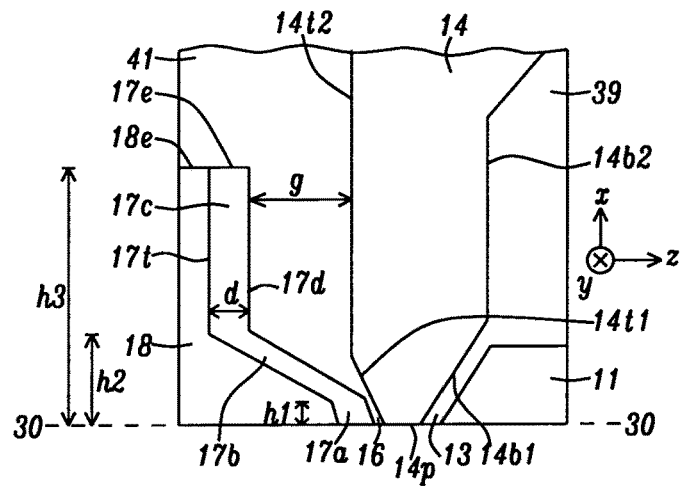
FIG. 6 is a down-track cross-sectional view along a center plane of the PMR writer in FIG. 5 according to an embodiment of the present disclosure.

To realize a gain in BPI without compromising TPI and ATI, all embodiments disclosed herein feature a patterned HMTS layer wherein a down-track cross-sectional view at center plane 50-50 is different from that at plane 51-51 (FIGS. 9, 11-12), or at plane 53-53 (FIG. 15) that are off track center. In a first embodiment, the down-track cross-sectional view at center plane 50-50 is represented by FIG. 6, which is different from the down-track cross-sectional view at plane 51-51 in FIG. 13. In second and third embodiments, the down-track cross-sectional view at center plane 50-50 is represented by FIG. 7. In all embodiments, HMTS DT thickness is either d or d1 as a function of cross-track position. Moreover, dielectric layer 41 has DT thickness g from 50 nm to 300 nm below HTMS back portions with thickness d, and a smaller DT thickness g1 from 10 nm to 200 nm below patterned HMTS back portions with thickness d1.

Figure 9:
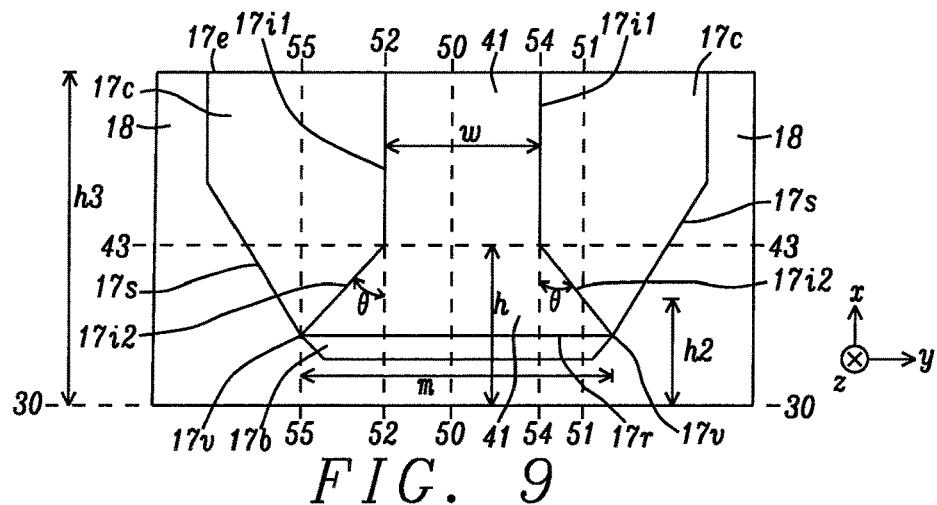
FIG. 9 is a top-down view of a patterned HMTS layer according to a first embodiment of the present disclosure wherein a first DT thickness (d) is formed inside a width w/2 from a center plane, and the DT thickness varies from d to d1 where d1>d at cross-track positions greater than width w/2 from the center plane.

Referring to FIG. 9, a first embodiment of a patterned HMTS layer in a PMR writer according to the present disclosure is depicted in a top-down view at plane 40-40 in FIG. 5. In particular, the POR design in FIG. 8 is modified to include a patterned region in the previously described unpatterned HMTS back portion in front of plane 43-43. Secondly, the HMTS back portion behind plane 43-43 now has an unpatterned region of width w and DT thickness d between plane 52-52 and plane 54-54 that are equidistant from center plane 50-50. Thus, the patterned region of HMTS back portion 17c behind plane 43-43 has inner sides 17i1 formed on plane 52-52 and plane 54-54. The HMTS back portion has a DT thickness d1 between an inner side 17i1 and outer side 17s. The pattern height h is from 100 nm to 500 nm, and width w is from 50 nm to 1 micron.

In front of plane 43-43, the HMTS back portion has DT thickness d1 in regions between inner side 17i2 and outer side 17s on each side of the center plane 50-50. Each inner side 1712 has a first end at plane 43-43 and a second (front) end at a backside 17r of the HMTS middle portion, and forms an angle θ with plane 52-52 or plane 54-54 where θ is from 10 degrees to 90 degrees. The HMTS back portion has DT thickness d within the trapezoid shape formed by plane 43-43, inner sides 17i2, and backside 17r that has a width m>w. Accordingly, as height within the trapezoid shape decreases from h to h2 proximate to the intersection of plane 51-51 and side 17i2, and eventually decreases to less than h2 at middle portion backside 17r, the cross-track width where the HMTS back portion has DT thickness d increases to a maximum value m between points 17v where backside 17r intersects outer sides 17s of the HMTS layer. Second TS layer 18 adjoins outer sides 17s.

Figure 13:
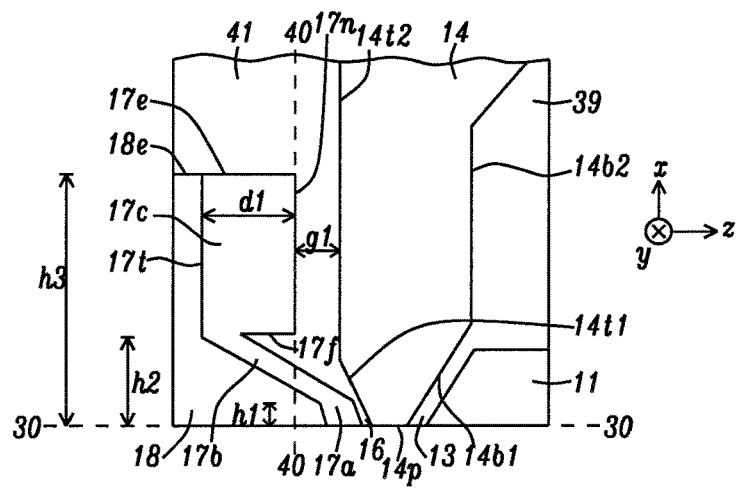
FIG. 13 is a down-track cross-sectional view along a plane that intersects a midpoint on a sloped inner side of the patterned HMTS layer of the first or second embodiment.
Figure 14:
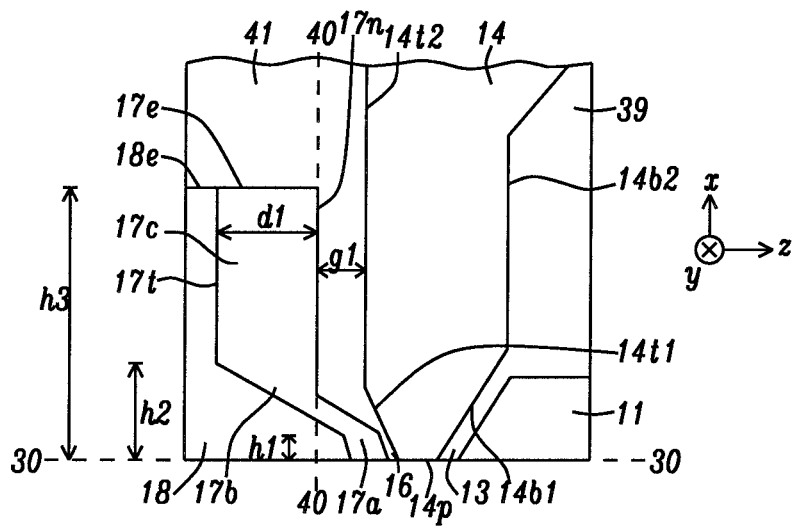
FIG. 14 is a down-track cross-sectional view along a plane that intersects a point where a backside of the HMTS middle portion joins an outer side of the patterned HMTS layer of the first or second embodiment.

At the center plane 50-50, and at cross-track positions between plane 52-52 and plane 54-54, the down-track cross-sectional view is found in FIG. 6 where the HMTS layers 17a-17c have a conformal DT thickness d. However, at plane 51-51 that intersects side 17i2 proximate to a midpoint thereof, the down-track cross-sectional view is shown in FIG. 13 where an ABS facing side 17f of the HMTS back portion 17c is at height h2 and thereby leaves only a small gap filled with dielectric layer 41 between plane 40-40 and HMTS middle portion 17b. DT thickness is d1 between front side 17f and backend 17e. At plane 55-55 that includes point 17v where HMTS inner side 17i2 intersects an outer HMTS side 17s on each side of the center plane, the down-track cross-sectional view is represented in FIG. 14 where the entire height between HMTS middle portion 17b and backend 17e is comprised of HMTS material with thickness d1. Accordingly, DT thickness is d1 within the patterned regions of HMTS back portion 17c in FIG. 9, and is d in unpatterned regions of the HMTS back portion described above. From this view, dielectric layer 41 fills gaps above plane 40-40 and below the HMTS back portion having thickness d.

Figure 10:
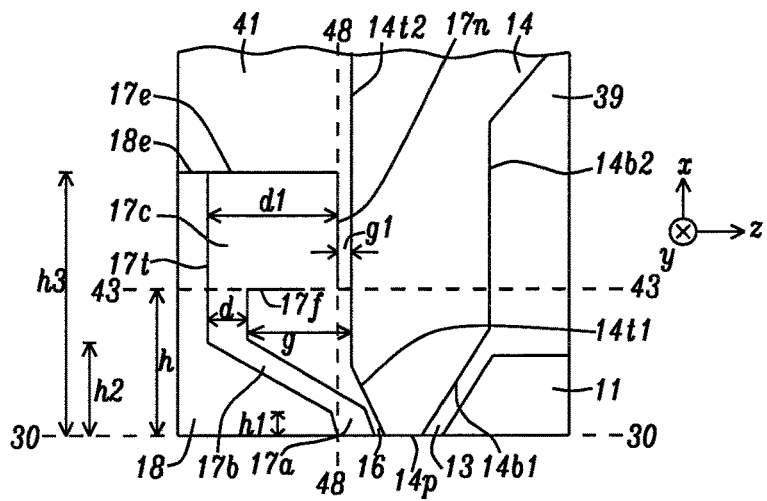
FIG. 10 is a down-track cross-sectional view of a patterned HMTS layer wherein a back portion thereof is a minimum gap distance from a MP top surface according to an embodiment of the present disclosure.

Referring to FIG. 10, the present disclosure also encompasses an embodiment where the bottom surface 17n of the patterned HMTS back portion is a minimum gap distance g1 from MP top surface 14t2. As a result, the bottom surface is formed on plane 48-48 that intersects the HMTS front portion at the ABS 30-30, rather than on plane 40-40 which intersects the HMTS middle portion at the ABS in the previous embodiment. Furthermore, there is a plurality of other embodiments (not shown) where the bottom surface 17n of the HMTS back portion may be formed at a plane between plane 40-40 and plane 48-48 in FIG. 5.

Figure 11:
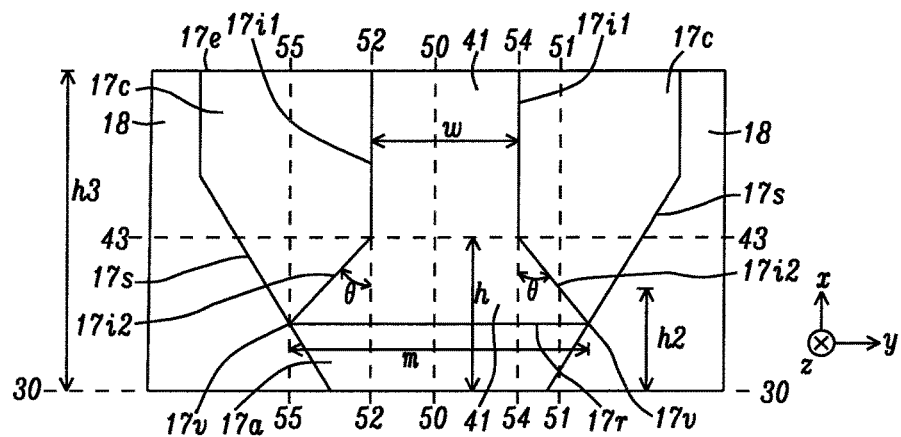
FIG. 11 is a top-down view of the patterned HMTS layer in FIG. 10 according to a first embodiment of the present disclosure.

In FIG. 11, a top-down view of the alternative embodiment in FIG. 10 is illustrated. Note that there is no longer a second TS shield layer 18 between the ABS 30-30 and the trapezoid shape comprising backside 17r. Instead, HMTS front portion 17a (at plane 48-48) fills the area between HMTS sides 17s, backside 17r, and the ABS. It should be understood that in the second and third embodiments shown in FIG. 12 and FIG. 15, respectively, an alternative embodiment may be employed where the HMTS bottom surface 17n is "lowered" from plane 40-40 to plane 48-48 to increase d1 and reduce g1 to a value proximate to 10 nm.

Figure 12:
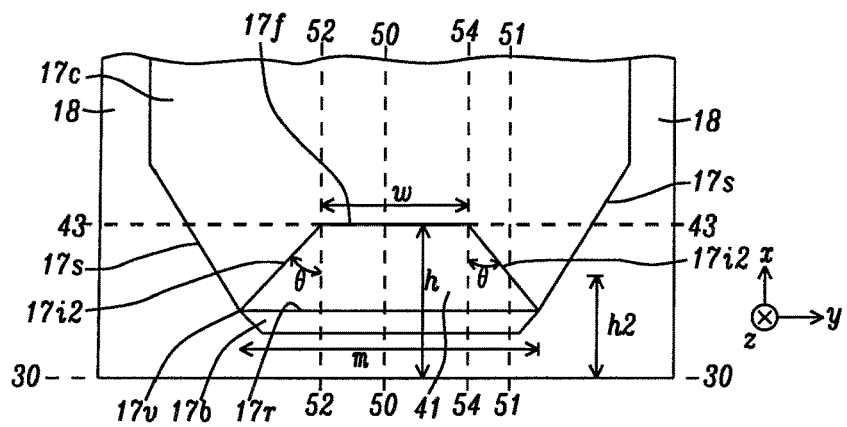
FIG. 12 is a top-down view of a patterned HMTS layer according to a second embodiment of the present disclosure wherein a first DT thickness (d) is formed inside a width w/2 from a center plane, and the DT thickness varies from d to d1 where d1>d at cross-track positions greater than width w/2 from the center plane.

Referring to FIG. 12, a second embodiment of a patterned HMTS layer according to the present disclosure is shown from a top-down view at plane 40-40 in FIG. 5. The HMTS pattern in FIG. 9 is modified with the removal of the unpatterned region behind plane 43-43 so that the entire HMTS back portion 17c at a height>h has only the DT thickness d1. In front of plane 43-43, the HMTS back portion retains the trapezoidal shape with a DT thickness d. Moreover, the patterned regions of HMTS back portion outside of the trapezoid shaped pattern have DT thickness d1. In both of the first and second embodiments, the benefit of forming a HMTS DT thickness d and gap g between the HMTS back portion and MP top surface proximate to the center plane is that BPI is enhanced without compromising TPI and ATI. Because of thinner DT thickness d, a larger TS return field is guaranteed proximate to the center plane at track center where transition sharpness matters most for writing quality. Meanwhile, greater DT thickness d1 is maintained in regions of the HMTS back portion outside the thinner DT regions to effectively shunt excessive MP fields and thereby protect SS return field (TPI) and ATI.

In the second embodiment, the down-track cross-sectional view at center plane 50-50 is illustrated in FIG. 7. The down-track cross-sectional view at plane 51-51 is provided by FIG. 13, and plane 40-40 intersects middle portion 17b between height h1 and height h2. However, as indicated earlier, the bottom surface 17n in patterned regions of the HMTS back portion may be lowered to plane 48-48 in some embodiments.

Figure 15:
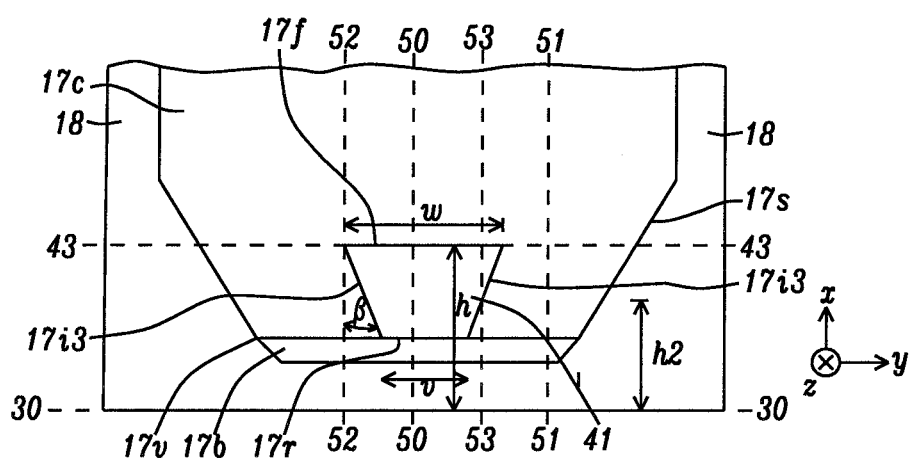
FIG. 15 is a top-down view of a patterned HMTS layer according to a third embodiment of the present disclosure wherein a the DT thickness varies from d to d1 (d1>d) inside a width w/2 from a center plane, and the DT thickness is d1 at cross-track positions greater than width w/2 from the center plane.

Referring to FIG. 15, a third embodiment of a patterned HMTS layer is depicted in a top-down view at plane 40-40 in FIG. 5. Note that the trapezoid shape with DT thickness d in the HMTS back portion 17c in front of plane 43-43 in the second embodiment is further reduced in area. In particular, the trapezoid shape is inverted so that the first side 17f at plane 43-43 has a width w greater than a width v at the second side (backside 17r). Inner sides 17i3 that connect the first and second sides in the trapezoid are formed at angle β with respect to plane 52-52 or plane 54-54 (not shown), and are a cross-track width<w/2 from center plane 50-50. Here, angle β has a minimum value of 0 degrees where side 17i3 overlays (not shown) on plane 52-52, but is less than −90 degrees because at −90 degrees, sides 17i3 will overlay on front side 17f and the trapezoid shape will no longer exist. Since the size of the unpatterned area proximate to the center plane is directly related to the BPI improvement, we believe the first embodiment offers the highest performance advantage (largest unpatterned area with DT thickness d) while the third embodiment provides the least advantage in view of the smallest unpatterned area. The down-track cross-sectional view at center plane 50-50 is shown in FIG. 7. The down-track cross-sectional view at plane 53-53 that intersects side 17i3 proximate to a midpoint thereof at height h2 is depicted in FIG. 13. The HMTS back portion has DT thickness d1 outside the trapezoid shape.

Figure 16:
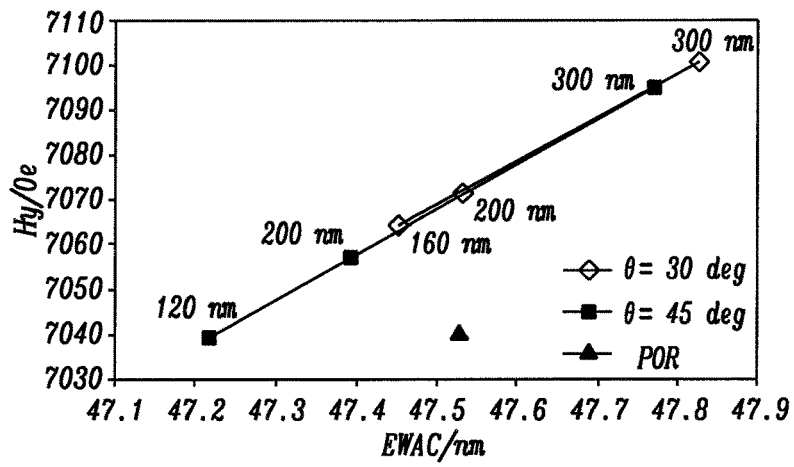
FIG. 16 is a graph that shows the results of Hy field vs. erase width in an AC field mode (EWAC) for a PMR writer with a patterned HMTS according to an embodiment of the present disclosure.
Figure 17:
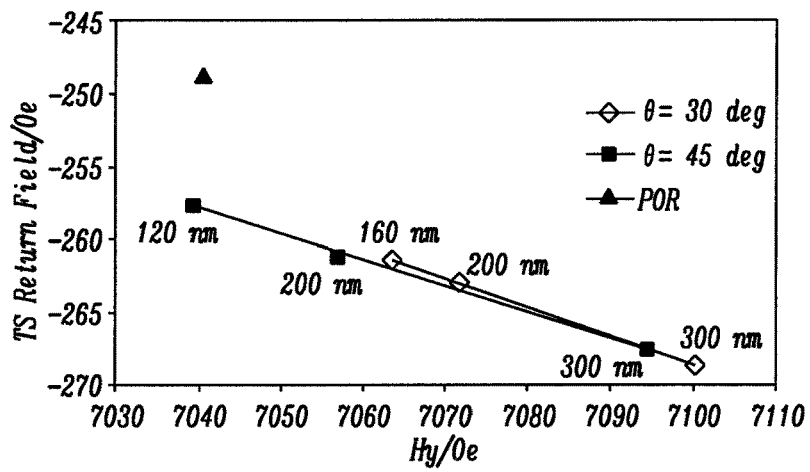
FIGS. 17-18 are graphs that show trailing shield return field, and side shield return field, respectively, as a function of Hy field according to an embodiment of the present disclosure.
Figure 18:
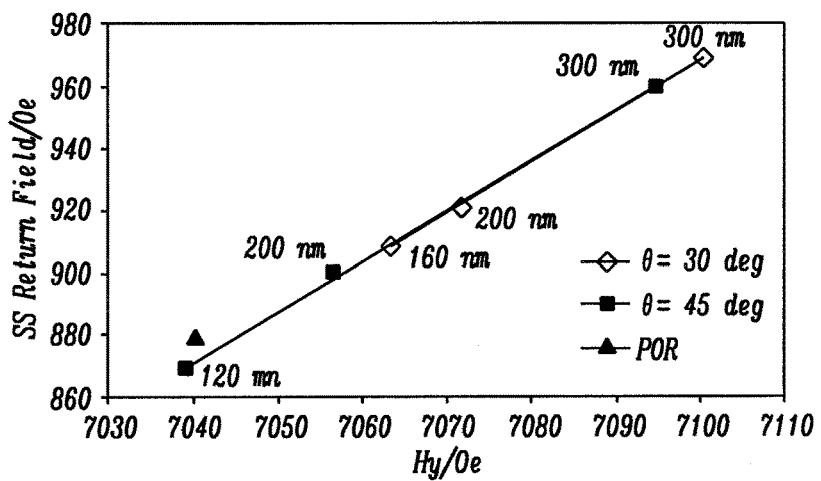

Referring to FIGS. 16-18, we have demonstrated the advantages of the patterned HMTS layer according to the first embodiment in an experiment using a finite element method (FEM) simulation to compare magnetic performance with that of the POR scheme described previously where DT thickness is uniform as a function of cross-track position. In this simulation, pattern height h is 200 nm, g1 is 200 nm, and g is 80 nm in the down-track cross-sectional view according to FIG. 7. Furthermore, the simulation relates to the top-down view of the first embodiment in FIG. 9 where the unpatterned region behind plane 43-43 at height h has cross-track width w, and the unpatterned region in front of the pattern height has a trapezoid shape formed by angle θ at an intersection of an inner side 17i2 with plane 52-52 or plane 54-54. For this experiment, angle θ is assigned a value of 30 degrees in one example, and 45 degrees in a second example. In both examples, the pattern width w was varied from 120 nm to 300 nm. The POR example is represented by the top-down view in FIG. 8, and with the down-track cross-sectional view in FIG. 7 at center track and at all off center track positions.

The plot of Hy field vs. EWAC in FIG. 16 indicates the first embodiment at both θ angles provides higher Hy at the same EWAC condition compared with the POR design. Also, at the same Hy field, the patterned HMTS layer of the first embodiment enables the PMR writer to have a more negative TS return field (FIG. 17) and a more negative SS return field (FIG. 18) than the POR scheme. Accordingly, BPI is enhanced and TPI and ATI are maintained, and in some cases improved, compared with the POR scheme. With further tuning and optimization, a net gain in overall ADC is expected from the patterned HMTS layer disclosed herein.

Figure 19:
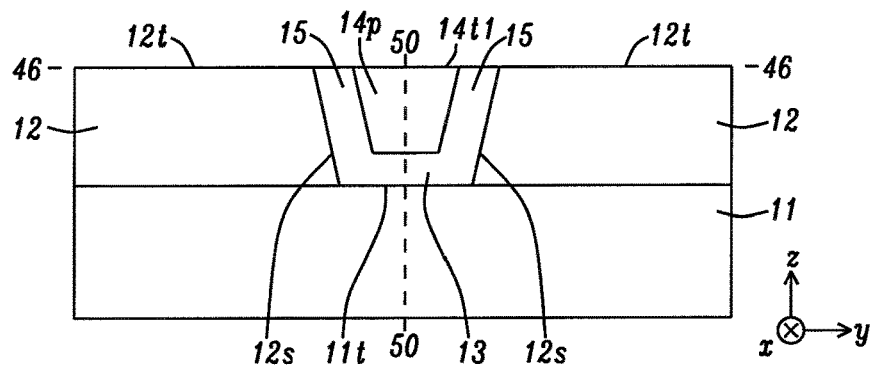
FIGS. 19-26 include ABS views (FIGS. 19, 23), down-track cross-sectional views (FIGS. 20-22, 24, 26), and a top down view (FIG. 25) of a series of steps used in fabricating a patterned HMTS layer of the present disclosure.

The present disclosure also encompasses a method of fabricating the patterned HMTS layer disclosed herein. The fabrication sequence begins with FIG. 19 where a PMR writer that is partially formed with a conventional series of steps is depicted from an ABS view. At this point, the main pole with MP pole tip 14p and trailing side 14t1 is formed, and the main pole is surrounded on the sides by side gaps 15 that adjoin inner sides 12s of the side shield 12, and on the leading side with lead gap 13 that contacts a top surface 11t of leading shield 11. There is a top surface of each side shield at plane 46-46.

Figure 20:
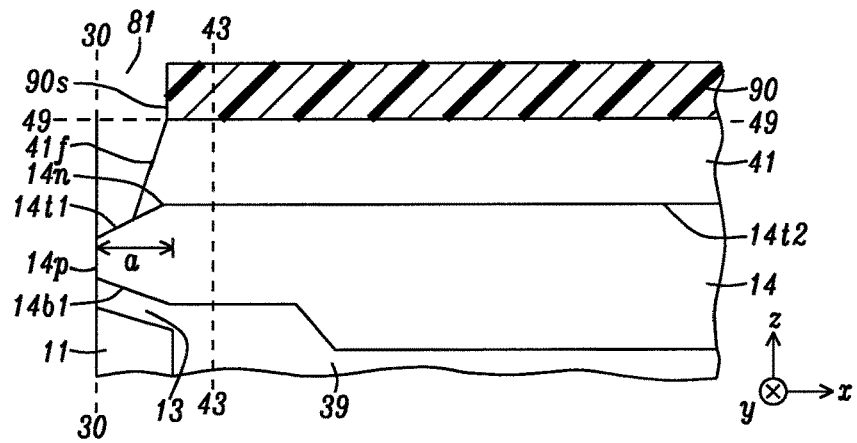

In the exemplary embodiment shown in FIG. 20, trailing side 14t1 is tapered so that the main pole 14 has increasing DT thickness with increasing height from plane 30-30 that will become the eventual ABS after a backend lapping process. The tapered trailing side connects with MP top surface 14t2 at corner 14n at height a. Dielectric layer 41 is deposited on the main pole layer with a chemical vapor deposition (CVD) or plasma enhanced CVD method, for example. A first photoresist layer 90 is coated on the dielectric layer and patterned with a photolithography process to yield opening 81 and a front side 90s on the photoresist layer proximate to height a. Thereafter, an angled ion beam etch (IBE) may be employed to removed unprotected portions of the dielectric layer and form sloped side 41f that faces the ABS, and thereby expose a portion of trailing side 14t1 proximate to the ABS.

Figure 21:
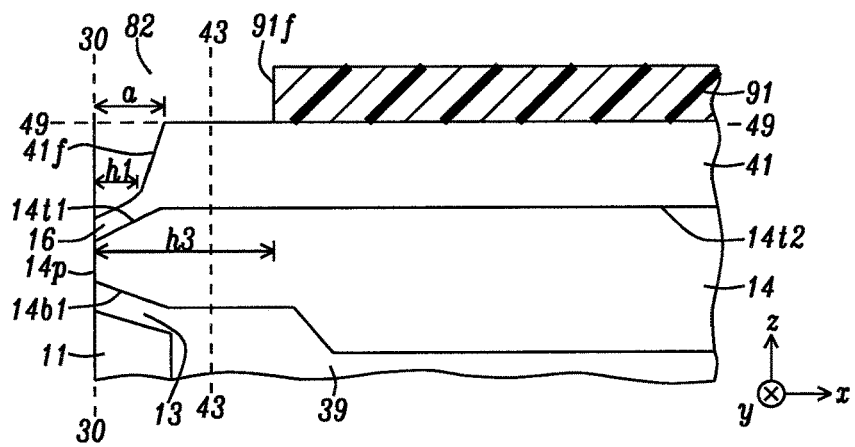

Referring to FIG. 21, the write gap 16 is deposited on the exposed portion of main pole trailing side 14t1, and photoresist layer 90 is removed by a conventional method. Typically, write gap material is also deposited on sloped side 41f. However, to simplify the drawing, the resulting dielectric layer below plane 49-49, and from the back side of write gap 16 at h1 up to height a is shown as dielectric layer 41. Thereafter, a second photoresist layer 91 is coated on the write gap and dielectric layer 41, and is patterned with a conventional method to yield opening 82, and a front side 91f on the photoresist layer at height h3.

Figure 22:
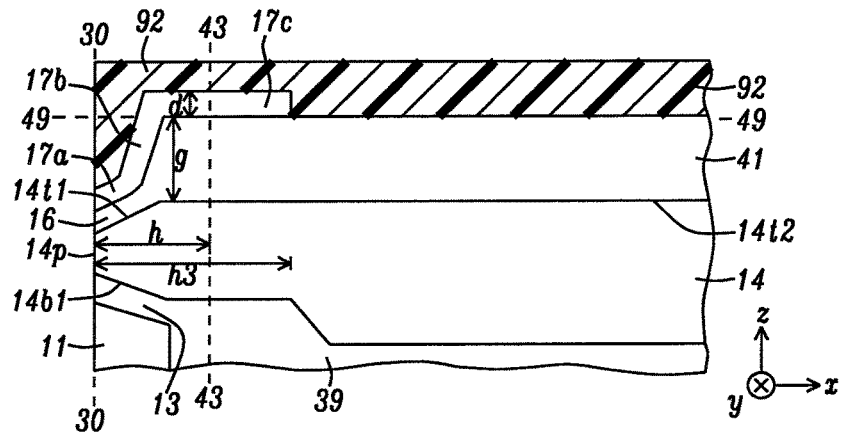

In FIG. 22, the HMTS layer comprised of front portion 17a, middle portion 17b, and back portion 17c is conformally deposited in opening 82 with a physical vapor deposition (PVD) process, for example, to give a HMTS thickness d from plane 30-30 to front side 91f. Dielectric layer 41 has a DT thickness g on MP top surface 14t2. The second photoresist layer is removed. Next, a third photoresist layer 92 is coated on HMTS layer, and is then patterned with a photolithography method to form sides 92s as depicted in a view from plane 30-30 in FIG. 23.

Figure 23:
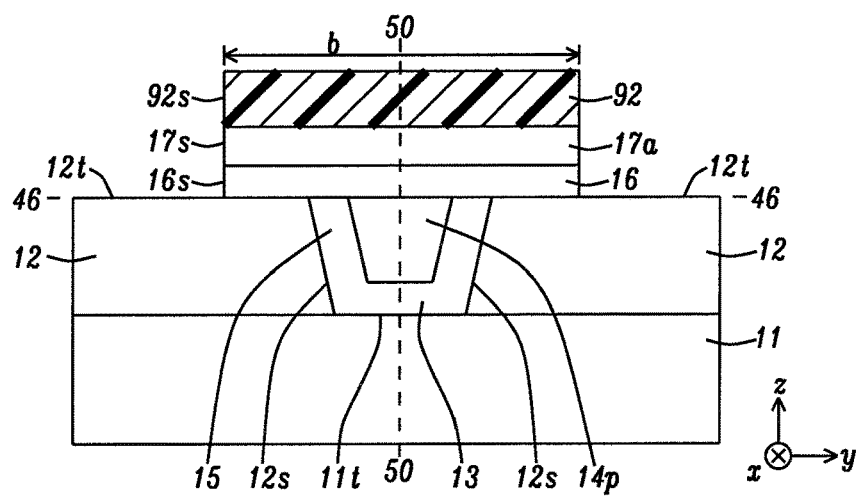

As shown in FIG. 23, photoresist layer 92 has sides 92s that are separated by a cross-track width b after the patterning step. Uncovered portions of the HMTS layer including front portion 17a are removed with an etch process that may involve IBE or reactive ion etch (RIE) conditions. The etch continues through the write gap 16 and stops on side shields 12 to provide an outer HMTS side 17s and write gap side 16s that are coplanar with a photoresist layer side 92s on each side of center plane 50-50.

Figure 24:
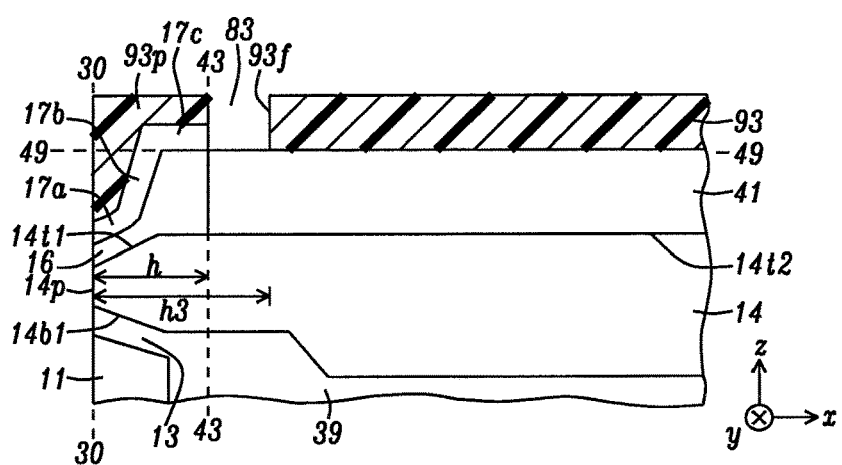

In FIG. 24, the third photoresist layer is removed and a fourth photoresist layer 93 is coated on the HMTS layer 17a-17c, and is patterned to give an opening 83 between plane 43-43 and a front side 93f at height h3. Opening 83 is designed to uncover regions of the HMTS back portion 17c that will have a greater DT thickness d1 after additional process steps are completed. The front part 93p of the photoresist pattern covers regions of the HMTS back portion that will have the lesser DT thickness d in the final device, and covers the HMTS front and middle portions. Subsequently, an etch process is employed to expand the opening 83 downward through exposed regions of the back portion 17c and underlying dielectric layer 41 and stops on the MP top surface 14t2.

Figure 25:
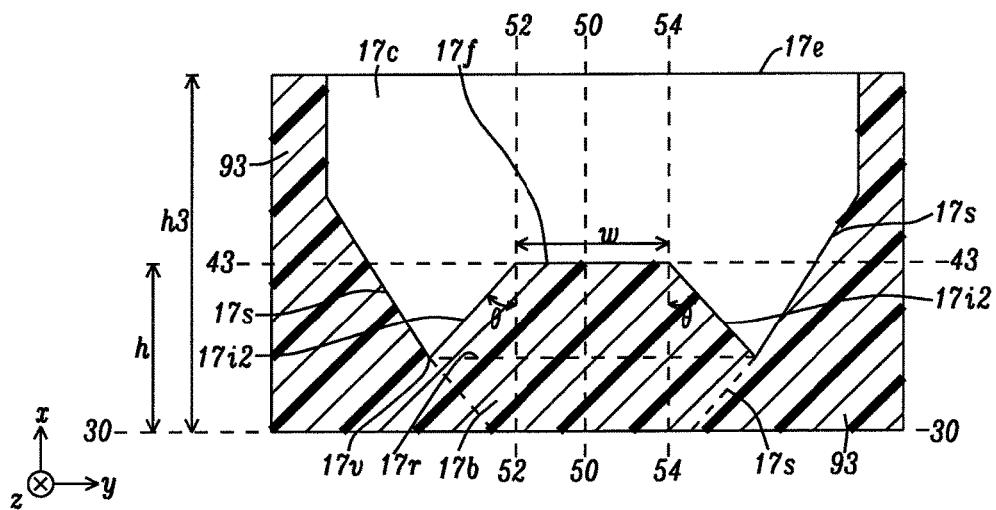

Referring to FIG. 25, a top-down view of the intermediate structure in FIG. 24 is shown after dielectric layer 41 with thickness g1, and HMTS layer 17c with thickness d1 (FIG. 26) are sequentially deposited in opening 83 where a back portion of the opening is behind plane 43-43, and front portions of the opening are between inner side 17i2 and outer side 17s on either side of the trapezoidal shape, according to the second embodiment described previously. Accordingly, the HMTS back portion 17c that was deposited in opening 83 has a front side 17f between plane 52-52 and plane 54-54, and is formed between plane 43-43 at height h and backend 17e at height h3. Furthermore, the HMTS deposition fills the region between inner side 17i2 and side 17s on each side of center plane 50-50.

Figure 26:
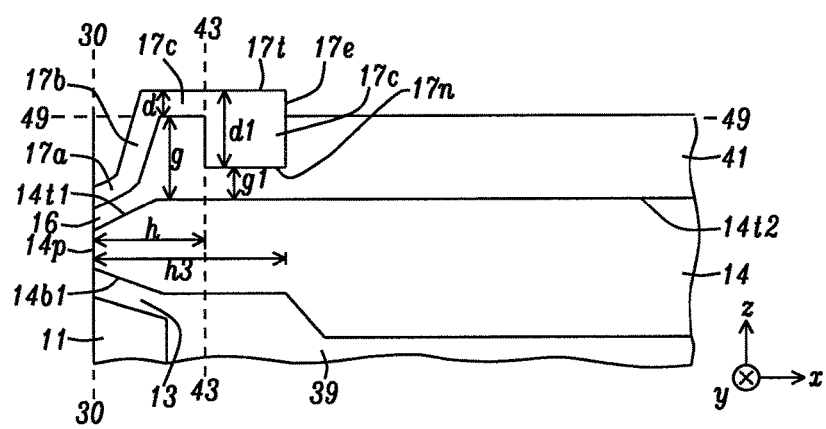

Referring to FIG. 26, photoresist layer 93 is removed to provide the intermediate PMR writer structure wherein the HMTS back portion 17c has top surface 17t, DT thickness d1 between bottom surface 17n and top surface 17c, and a backend 17e. In summary, the thinner HMTS back portion with DT thickness d in front of plane 43-43 is formed with a difference series of process steps than the thicker HMTS back portion behind plane 43-43, and in the regions between an inner side 17i2 and outer side 17s shown in FIG. 25. According to one embodiment, the dielectric material filling gap g1 is made of the same material as in dielectric layer 41.

Thereafter, the remaining layers in the write head including the second TS layer 18, top yoke 18x, PP3 trailing shield 26, and driving coils 60d are fabricated by methods well known to those skilled in the art and are not shown herein. Finally, a lapping process is performed to form an ABS at plane 30-30.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer, comprising:
   (a) a main pole (MP) with a top surface that is aligned orthogonal to an air bearing surface (ABS), and having a MP tip with a trailing side at the ABS wherein the trailing side is bisected by a center plane;
   (b) a trailing shield comprised of a high moment trailing shield (HMTS) layer with a magnetization saturation value from 16 kiloGauss (kG) to about 24 kG, and having a front portion formed on a write gap at the ABS; the HMTS layer comprises:
      (1) the front portion that extends to a first height (h1) from the ABS;
      (2) a middle portion that adjoins a backside of the front portion at h1 and extends to a second height (h2) from the ABS where h2>h1, and the middle portion at h2 is a greater down-track distance from the MP than at h1; and
      (3) a back portion that adjoins a backside of the middle portion at h2 and extends to a backend at a third height (h3) from the ABS, and has a top surface formed parallel to the MP top surface, and wherein the back portion has a first down-track (DT) thickness d1 in at least a region adjacent to an outer side thereof on each side of the center plane, and behind a first plane at a pattern height (h) where h>h2, and in regions in front of the first plane that are outside of a trapezoidal shape having a first side at the first plane, a second side at a backside of the front portion or middle portion, a first inner side formed at an angle θ with respect to a second plane that intersects the first plane at width w/2 from the center plane, and a second inner side formed at angle θ with respect to a third plane at width w/2 on an opposite side of the center plane, wherein the second and third planes are parallel and the first and second inner sides have increasing separation with decreasing height from the ABS, and wherein the back portion has a second DT thickness d within the trapezoid shape where d<d1; and
   (c) a dielectric layer formed between the HMTS back portion and the MP top surface wherein the dielectric layer has a DT thickness g in portions thereof formed below the HMTS back portion having thickness d, and a DT thickness g1, where g>g1, below the HMTS back portion having thickness d1.

2. The PMR writer of claim 1 wherein the HMTS back portion has only the first DT thickness d1 behind the first plane.

3. The PMR writer of claim 1 wherein the HTMS back portion has the second DT thickness d in a region having width w between the second and third planes, and behind the first plane, and wherein the HMTS back portion that is behind the first plane has the first DT thickness d1 between the second plane and outer side on one side of the center plane, and between the third plane and the outer side on the other side of the center plane.

4. The PMR writer of claim 1 wherein the angle θ is from 10 degrees to 90 degrees.

5. The PMR writer of claim 1 wherein g is from 50 nm to 300 nm, and g1 is from 10 nm to 200 nm.

6. The PMR writer of claim 1 wherein h is from 100 nm to 500 nm.

7. The PMR writer of claim 1 wherein w is from 50 nm to 1 micron.

8. The PMR writer of claim 1 wherein the trailing shield further comprises a second trailing shield (TS) layer formed on the HMTS layer, and that adjoins the outer side of the HTMS layer and a side of the write gap on each side of the center plane at the ABS.

9. The PMR writer of claim 8 wherein an all wrap around shield structure is formed at the ABS, and comprises the trailing shield structure, a side shield that adjoins a bottom surface of the second TS layer on each side of the center plane, and a leading shield that adjoins a bottom surface of the side shield.

10. The PMR writer of claim 1 wherein each of the first and second inner sides intersect an outer side of the HMTS layer at an end of the second side of the trapezoidal shape.

11. The PMR writer of claim 1 wherein the HMTS back portion with DT thickness d1 has a bottom surface formed on a plane that is parallel to the MP top surface, and intersects the HMTS front portion at the ABS, or intersects the HMTS middle portion between h1 and h2.

12. A head gimbal assembly (HGA), comprising:
   (a) a slider on which the PMR writer of claim 1 is formed; and
   (b) a suspension that has a flexure to which the slider is joined, a load beam with one end connected to the flexure, and a base plate connected to the other end of the load beam.

13. A magnetic recording apparatus, comprising:
   (a) the HGA of claim 12;
   (b) a magnetic recording medium positioned opposite to the slider;
   (c) a spindle motor that rotates and drives the magnetic recording medium; and
   (d) a device that supports the slider, and that positions the slider relative to the magnetic recording medium.

14. A perpendicular magnetic recording (PMR) writer, comprising:
   (a) a main pole (MP) with a top surface that is aligned orthogonal to an air bearing surface (ABS), and having a MP tip with a trailing side at the ABS wherein the trailing side is bisected by a center plane;
   (b) a trailing shield comprised of a high moment trailing shield (HMTS) layer with a magnetization saturation value from 16 kiloGauss (kG) to about 24 kG, and having a front portion formed on a write gap at the ABS; the HMTS layer comprises:
      (1) the front portion that extends to a first height (h1) from the ABS;
      (2) a middle portion that adjoins a backside of the front portion at h1 and extends to a second height (h2) from the ABS where h2>h1, and the middle portion at h2 is a greater down-track distance from the MP than at h1; and
      (3) a back portion that adjoins a backside of the middle portion at h2 and extends to a backend at a third height (h3) from the ABS, and has a top surface formed parallel to the MP top surface, and wherein the back portion has a first down-track (DT) thickness d1 behind a first plane at a pattern height (h) where h>h2, and in regions in front of the first plane that are outside of a trapezoidal shape having a first side at the first plane, a second side at a backside of the front portion or middle portion, a first inner side formed at an angle β with respect to a second plane that intersects the first plane at width w/2 from the center plane, and a second inner side formed at angle β with respect to a third plane at width w/2 on an opposite side of the center plane, wherein the second and third planes are parallel and the first and second inner sides have decreasing separation with decreasing height from the ABS, and wherein the back portion has a second DT thickness d within the trapezoid shape where d<d1; and (c) a dielectric layer formed between the HMTS back portion and the MP top surface wherein the dielectric layer has a DT thickness g in portions thereof formed below the HMTS back portion having thickness d, and a DT thickness g1, where g>g1, below the HMTS back portion having thickness d1.

15. The PMR writer of claim 14 wherein the angle β is between 0 degrees and −90 degrees.

16. The PMR writer of claim 14 wherein g is from 50 nm to 300 nm, and g1 is from 10 nm to 200 nm.

17. The PMR writer of claim 14 wherein h is from 100 nm to 500 nm.

18. The PMR writer of claim 14 wherein w is from 50 nm to 1 micron.

19. The PMR writer of claim 14 wherein the HMTS back portion with DT thickness d1 has a bottom surface formed on a plane that is parallel to the MP top surface, and intersects the HMTS front portion at the ABS, or intersects the HMTS middle portion between h1 and h2.

20. A head gimbal assembly (HGA), comprising:
(a) a slider on which the PMR writer of claim 14 is formed; and
(b) a suspension that has a flexure to which the slider is joined, a load beam with one end connected to the flexure, and a base plate connected to the other end of the load beam.

21. A magnetic recording apparatus, comprising:
(a) the HGA of claim 20;
(b) a magnetic recording medium positioned opposite to the slider;
(c) a spindle motor that rotates and drives the magnetic recording medium; and
(d) a device that supports the slider, and that positions the slider relative to the magnetic recording medium.

22. A method of forming a patterned trailing shield layer in a perpendicular magnetic recording (PMR) writer, comprising:
(a) providing a substrate comprised of a main pole (MP) having a trailing side bisected by a center plane, and formed between two MP sides at a first plane; wherein the trailing side extends from the first plane to a first height (a) from the first plane where the trailing side connects with a MP top surface;
(b) forming a dielectric layer on the substrate, wherein the dielectric layer has a first portion with a down-track (DT) thickness "g" on the MP top surface;
(c) forming a first opening in the dielectric layer proximate to the first plane, and depositing a write gap on the MP trailing side within the first opening;
(d) depositing a first trailing shield (HMTS) layer with a conformal thickness "d" on the write gap and on the dielectric layer so that a HMTS front portion is formed on the write gap, a HMTS middle portion is formed on the dielectric layer from a backside of the HMTS front portion to height h2, and a first HMTS back portion is formed on the first portion of the dielectric layer between h2 and a HMTS backend at height h3;
(e) forming two outer sides on the HMTS layer that extend from the first plane to the HMTS backend at h3;
(f) forming a second opening by removing the first HMTS back portion between a second plane at a pattern height h and the backend at h3, where h>h2; and simultaneously forming a third opening in the first HMTS back portion between an inner side extending from one end at the second plane to a second end at a backside of the HMTS middle or front portion, and an outer HMTS side on each side of the center plane such that first and second inner sides form an angle θ with a third plane and fourth plane, respectively, that are equidistant from the center plane and separated by a cross-track width w, and then extending the second and third openings in a down-track direction to expose a portion of the MP top surface that is orthogonal to the first plane; and
(g) depositing a second dielectric layer portion with a DT thickness g1, where g1<g, in the second and third openings, and then depositing a second HMTS back portion with a DT thickness d1, where d1>d, on the second dielectric layer portion.

23. The method of claim 22 further comprised of depositing a second trailing shield on the first trailing shield layer, and performing a lapping process so that the first plane becomes an air bearing surface (ABS).

24. The method of claim 22 wherein g is from 50 nm to 300 nm, and g1 is from 10 nm to 200 nm.

25. The method of claim 22 wherein the pattern height h is from 100 nm to 500 nm.

26. The method of claim 22 wherein the cross-track width w is from 50 nm to 1 micron.

27. The method of claim 22 wherein angle θ is from 10 degrees to 90 degrees.

28. The method of claim 22 wherein the first HMTS back portion with a thickness d has a trapezoidal shape from a top-down view wherein a first side at the second plane has the width w, and a second side at the backside of the HMTS front or middle portion has a cross-track width>w.

29. The method of claim 22 wherein the first trailing shield layer is made of magnetic material having a magnetic saturation value that is from 16 kiloGauss (kG) to about 24 kG.

* * * * *